US012480458B2

(12) United States Patent
Colebrooke

(10) Patent No.: US 12,480,458 B2
(45) Date of Patent: Nov. 25, 2025

(54) GAS TURBINE ENGINE DUCTING SYSTEM HAVING A PLURALITY OF SPHERICAL JOINTS

(71) Applicant: ROLLS-ROYCE plc, London (GB)

(72) Inventor: Jack F Colebrooke, Derby (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 18/979,020

(22) Filed: Dec. 12, 2024

(65) Prior Publication Data
US 2025/0223934 A1   Jul. 10, 2025

(30) Foreign Application Priority Data

Jan. 8, 2024 (GB) .................................. 2400242

(51) Int. Cl.
| F02K 1/12 | (2006.01) |
| F02K 1/80 | (2006.01) |
| F02K 1/82 | (2006.01) |
| F02K 3/06 | (2006.01) |
| F23R 3/60 | (2006.01) |

(52) U.S. Cl.
CPC .............. *F02K 1/1223* (2013.01); *F02K 1/80* (2013.01); *F02K 1/82* (2013.01); *F02K 3/06* (2013.01); *F23R 3/60* (2013.01)

(58) Field of Classification Search
CPC . F02K 1/1223; F02K 1/80; F02K 1/82; F02K 3/06; F23R 3/60; F16L 27/04; F16L 27/06; F16C 11/08–12
See application file for complete search history.

(56) References Cited

U.S. PATENT DOCUMENTS

| 4,087,323 | A | * | 5/1978 | Sullivan | ................ | F16L 27/026 |
| | | | | | | 976/DIG. 11 |
| 4,946,202 | A | * | 8/1990 | Perricone | ............. | H02G 3/0481 |
| | | | | | | 285/153.2 |
| 5,603,531 | A | | 2/1997 | Maier | | |
| 5,897,146 | A | * | 4/1999 | Saito | ..................... | F16L 27/026 |
| | | | | | | 285/302 |
| 6,056,329 | A | * | 5/2000 | Kitani | ..................... | F16L 27/12 |
| | | | | | | 285/302 |
| 6,250,690 | B1 | * | 6/2001 | Sakai | ...................... | F16L 27/04 |
| | | | | | | 285/302 |

(Continued)

OTHER PUBLICATIONS

Jul. 3, 2024 Combined Search Report and Examination Report issued in British Patent Application No. 2400242.0.

*Primary Examiner* — William H Rodriguez
(74) *Attorney, Agent, or Firm* — Oliff PLC

(57) ABSTRACT

There is described an articulatable ducting system 700 for a gas turbine engine. The system comprises a first structure 710, a second structure 720, a first spherical joint 740, a second spherical joint 750 and a conduit 730. The first structure 710 defines a first internal volume 711. The second structure 720 defines a second internal volume 721, with the second structure 720 being movable with respect to the first structure 710. The first spherical joint 740 is associated with the first structure 710 and the second spherical joint 750 is associated with the second structure 720. The conduit 730 extends between the first and second spherical joints 740, 750 and thereby fluidically connects the first internal volume 711 to the second internal volume 721.

15 Claims, 9 Drawing Sheets

(56) References Cited

U.S. PATENT DOCUMENTS

| | | | | |
|---|---|---|---|---|
| 6,299,217 | B1* | 10/2001 | Saito | F16L 27/125 |
| | | | | 285/302 |
| 6,705,647 | B1* | 3/2004 | Palmer | F16L 27/047 |
| | | | | 285/271 |
| 7,784,835 | B1* | 8/2010 | Keays | F16L 27/04 |
| | | | | 285/302 |
| 2003/0077110 | A1* | 4/2003 | Knowles | B60H 1/00571 |
| | | | | 403/56 |
| 2005/0210864 | A1 | 9/2005 | Lapergue et al. | |
| 2009/0077978 | A1* | 3/2009 | Figueroa | F02C 7/20 |
| | | | | 60/766 |
| 2010/0295293 | A1 | 11/2010 | Healy et al. | |
| 2015/0338003 | A1* | 11/2015 | Saito | F16L 27/04 |
| | | | | 285/261 |

\* cited by examiner

GAS TURBINE ENGINE DUCTING SYSTEM HAVING A PLURALITY OF SPHERICAL JOINTS

This disclosure claims the benefit of UK Patent Application No. GB 2400242.0 filed on 8 Jan. 2024, which is hereby incorporated herein in its entirety.

BACKGROUND

Technical Field

The present disclosure relates to articulatable ducting systems for gas turbine engines. Such systems comprise first and second structures as well as at least one conduit fluidically connecting respective internal volumes defined by the first and second structures.

Background of the Disclosure

It is known for gas turbine engines to have variable geometry exhaust nozzles. Such variable geometry exhaust nozzles comprise exhaust flaps that may be individually controlled to vary the exit area of the exhaust nozzle. Variable geometry exhaust nozzles may be used to maximise the production of thrust at high nozzle pressure ratios and to provide thrust vectoring. Thrust vectoring may also be provided by independently controlling the exhaust flaps.

In use, the material of the exhaust nozzle is typically at a high temperature (especially in the context of gas turbine engines comprising and using a reheat/afterburner). To restrain the temperature of the material of the exhaust nozzle, the exhaust flaps are typically cooled by means of a thin layer of air (often referred to as a film) which is present between the exhaust gas flowing through the exhaust nozzle and the gas-washed/gas-exposed surface(s) of the exhaust flaps. This film provides a fluidic boundary which, during operation, reduces a rate of heat transfer into the exhaust flaps compared to an arrangement in which it is not present. This may be referred to as film cooling.

However, ensuring the film remains effective over a major portion (e.g., substantially the whole) of gas-exposed surface(s) of the exhaust flaps requires the use of a significant amount of airflow. This airflow may be derived from (e.g., bled from) an upstream part of the gas turbine engine or driven by an air moving device which is powered by the gas turbine engine. Accordingly, use of a significant amount of airflow for the purpose of film cooling of the exhaust flap(s) is associated with a substantially reduced thrust output of the gas turbine engine.

It is desirable to provide more effective ways of cooling the exhaust flaps of a gas turbine engine. In particular, it is desirable to provide systems for cooling the exhaust flaps of a gas turbine engine the use of which does not result in a substantially reduced thrust output from the gas turbine engine to which they are provided. The present disclosure has been devised with the foregoing in mind.

SUMMARY

According to a first aspect of the present disclosure, there is provided an articulatable ducting system for a gas turbine engine, the system comprising: a first structure defining a first internal volume; a second structure defining a second internal volume, the second structure being movable with respect to the first structure; a first spherical joint associated with the first structure; a second spherical joint associated with the second structure; and a conduit extending between the first and second spherical joints and thereby fluidically connecting the first internal volume to the second internal volume.

It may be that the system is configured such that the second structure is translatable relative to the first structure in three mutually orthogonal directions.

It may be that system is configured such that the second structure is rotatable relative to the first structure in three mutually orthogonal directions.

The conduit may be configured so as not to rotate relative to the first spherical joint and/or second spherical joint about a longitudinal axis of the conduit. For example, the conduit may comprise at least one spline (or recess for receiving at least one spline) to restrict relative rotation. The conduit may rotate with respect to only one or neither of the first and second spherical joints. Likewise, the conduit may be configured so as not to translate relative to the first spherical joint or second spherical joint. In other words, the conduit may translate with respect to only one of the first and second spherical joints.

It may be that the conduit is configured to move with respect to the second spherical joint so as to at least partially extend into the second internal volume. It may be that the conduit is configured to slide with respect to the second spherical joint so as to at least partially extend into the second internal volume.

Each spherical joint may comprise complementary inner and outer formations. The inner and outer formations of a particular spherical joint may each comprise spherical segment surface portions that slidably engage one another. It may be that conduit is fixed with respect to the inner formation of the first spherical joint. It may be that the outer formation of each spherical joint is defined by a respective one of the structures. The inner and outer formations of each spherical joint may substantially cooperate to provide a clearance fit therebetween. The conduit may extend into a pneumatic seal disposed within the inner formation of at least one of the spherical joints.

It may be that the second structure includes, or is, a flap configured to at least partially define an exhaust gas passageway of a gas turbine engine.

It may be that the system is configured to convey a fluid from the first internal volume to the second internal volume via the conduit for cooling the second structure.

It may be that: the first spherical joint is one of a plurality of first spherical joints, each associated with the first structure; the second spherical joint is one of a plurality of second spherical joints, each associated with the second structure; and the conduit is one of a plurality of conduits, each extending between respective first and second spherical joints and thereby fluidically connecting the first internal volume to the second internal volume.

According to a second aspect of the present disclosure, there is provided assembly for a gas turbine engine comprising an articulatable ducting system in accordance with the first aspect, the assembly being configured to form at least a part of: an exhaust nozzle; a combustor; or a reheat.

According to a third aspect of the present disclosure, there is provided an exhaust nozzle for a gas turbine engine comprising an articulatable ducting system in accordance with the first aspect.

According to a fourth aspect of the present disclosure, there is provided a combustor for a gas turbine engine comprising an articulatable ducting system in accordance with the first aspect.

According to a fifth aspect of the present disclosure, there is provided a reheat for a gas turbine engine comprising an articulatable ducting system in accordance with the first aspect.

According to a sixth aspect of the present disclosure, there is provided a gas turbine engine comprising: an articulatable ducting system in accordance with the first aspect; an assembly in accordance with the second aspect; an exhaust nozzle in accordance with the third aspect; a combustor in accordance with the fourth aspect; or a reheat in accordance with the fifth aspect.

It may be that the first structure is configured to receive a gas from a compressor or a propulsive fan of the gas turbine engine, and wherein the system is configured to convey the gas from the first internal volume to the second internal volume via the conduit.

According to a seventh aspect of the present disclosure, there is provided an aircraft comprising an articulating ducting system in accordance with the first aspect, an assembly in accordance with the second aspect and/or a gas turbine engine in accordance with the sixth aspect.

BRIEF DESCRIPTION OF THE DRAWINGS

Embodiments will now be described by way of example only with reference to the accompanying drawings, which are purely schematic and not to scale, and in which.

DETAILED DESCRIPTION

Figure 1:
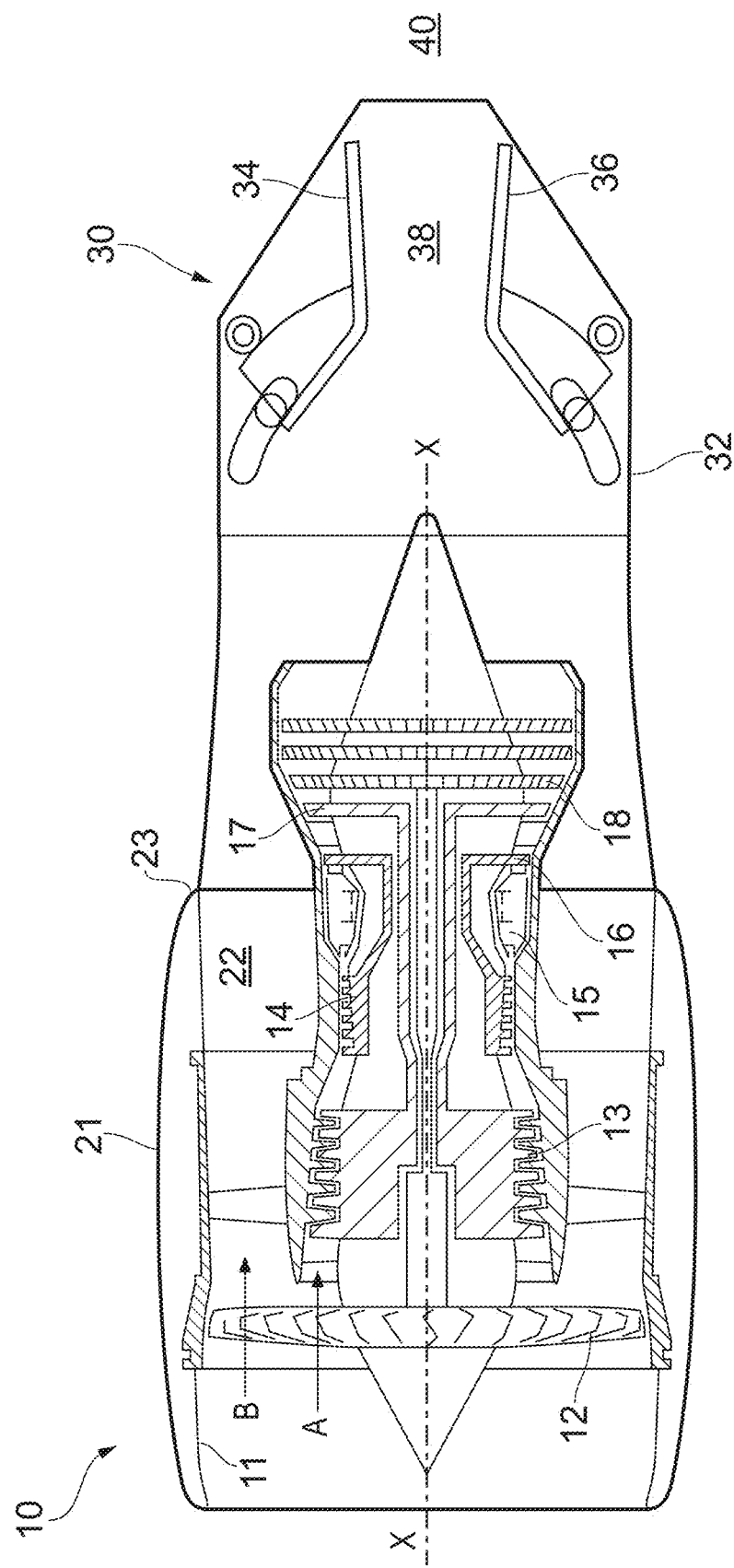
FIG. 1 is a cross-sectional view of an example gas turbine engine and an exhaust nozzle.

FIG. 1 shows a ducted fan gas turbine engine 10 having a principal and rotational axis X-X. The engine comprises, in axial flow series, an air intake 11, a propulsive fan 12, an intermediate-pressure compressor 13, a high-pressure compressor 14, a combustor 15, a high-pressure turbine 16, an intermediate pressure turbine 17, a low-pressure turbine 18 and a core engine exhaust nozzle 19. A nacelle 21 generally surrounds the gas turbine engine 10 and defines the intake 11, a bypass duct 22 and a bypass exhaust nozzle 23.

During operation, air entering the intake 11 is accelerated by the fan 12 to produce two air flows: a first air flow A into the intermediate pressure compressor 13 and a second air flow B which passes through the bypass duct 22 to provide propulsive thrust. The intermediate-pressure compressor 13 compresses the air flow A directed into it before delivering that air to the high-pressure compressor 14 where further compression takes place.

The compressed air exhausted from the high-pressure compressor 14 is directed into the combustor 15 where it is mixed with fuel and the mixture combusted. The resultant hot combustion products then expand through, and thereby drive the high, intermediate and low-pressure turbines 16, 17, 18 before being exhausted through the core engine exhaust nozzle 19 to provide additional propulsive thrust. The high, intermediate and low-pressure turbines respectively drive the high and intermediate pressure compressors 14, 13 and the fan 12 by suitable interconnecting shafts.

The gas turbine engine 10 further comprises an exhaust nozzle 30. The exhaust nozzle 30 is disposed at a rear end of the gas turbine engine 10 and generally comprises an exhaust duct 32, a first flap 34 (also referred to as a petal) and a second flap 36. The exhaust duct 32 is configured to receive an exhaust flow of gas from the combustor 15 (i.e., the first air flow A after it has passed through the combustor 15). The exhaust duct is further configured to receive the second air flow B after it has passed through the bypass duct 22. The first and second flaps 34, 36 in part define an exhaust gas passageway 38 configured to convey the exhaust flow of gas to an exterior 40 of the gas turbine engine 10.

Figure 2:
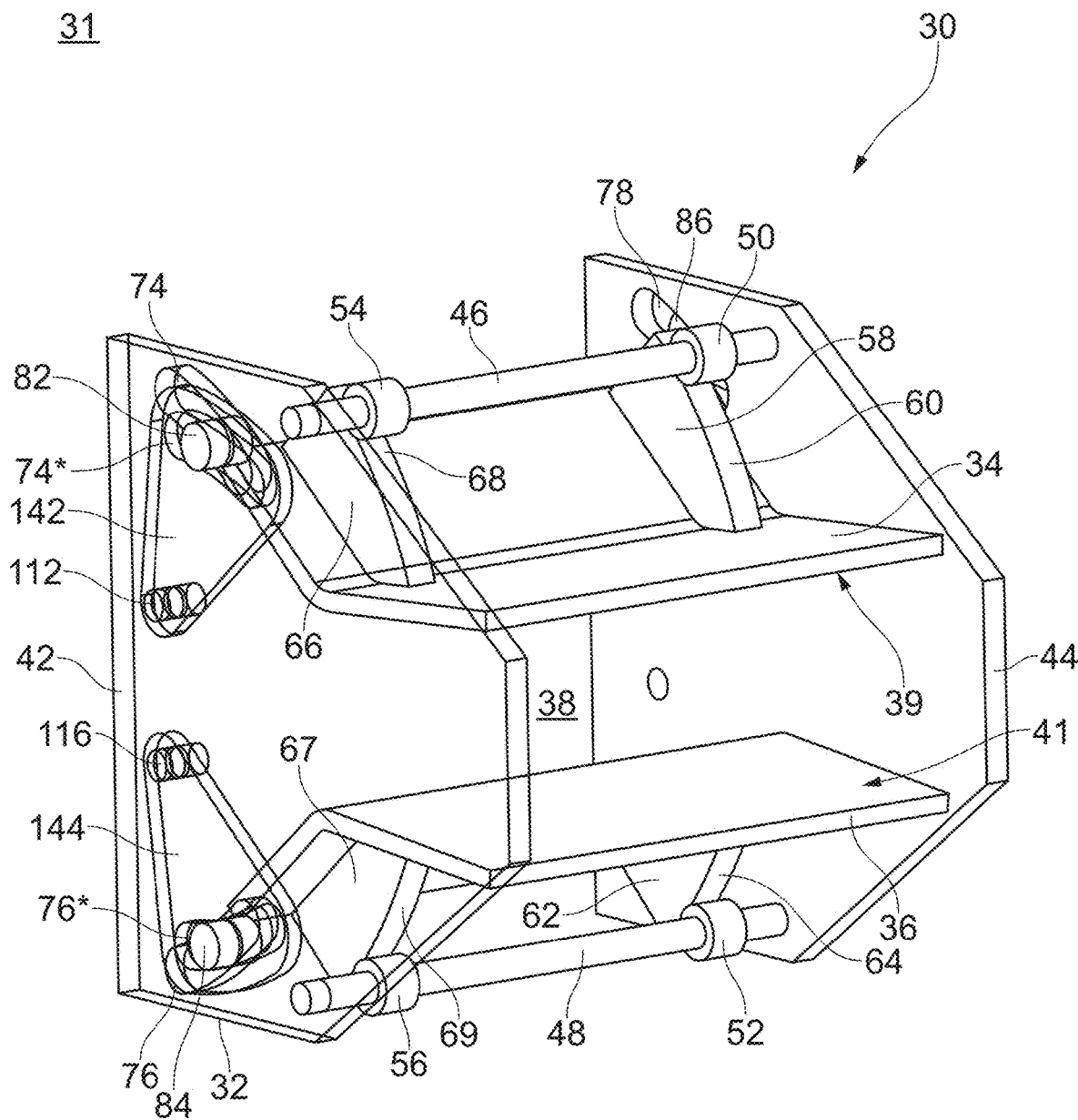
FIG. 2 is a perspective view of an example exhaust nozzle in isolation.

FIG. 2 is a perspective view of an example exhaust nozzle 30 suitable for use as the exhaust nozzle 30 in the gas turbine engine 10 of FIG. 1. FIG. 2 presents a rectangular nozzle. As shown, the exhaust duct 32 comprises a first side wall 42 and a second side wall 44. The first and second side walls 42, 44 are spaced apart from each other. The first flap 34 is disposed between the first and second side walls 42, 44 in an upper portion of the exhaust nozzle 30. The second flap 36 is disposed between the first and second side walls 42, 44 in a lower portion of the exhaust nozzle 30. The first and second flaps 34, 36 seal against the first and second side walls 42, 44 by means of a conformal controlled gap. The first flap 34 comprises a first control surface 39 and the second flap 36 comprises a second control surface 41. The first control surface 39 and the second control surface 41 in part define (along with the first and second side walls 42, 44) the exhaust gas passageway 38. The first and second control surfaces 39, 41 are geometrically similar and are reflections of each other.

A first shaft or tiebar 46 extends between the first and second side walls 42, 44 in an upper portion of the exhaust nozzle 30. A second shaft or tiebar 48 extends between the first and second side walls 42, 44 in a lower portion of the exhaust nozzle 30. A first roller 54 is rotatably supported by the first shaft 46 and a second roller 56 is rotatably supported by the second shaft 48. In addition, a third roller 50 is rotatably supported by the first shaft 46 and a fourth roller 52 is rotatably supported by the second shaft 48. The first flap 34 comprises a first cam track or flange 66 that protrudes from the respective control surface to define a first bearing surface 68. The second flap 36 comprises a second cam track or flange 67 that similarly protrudes from the respective control surface to define a second bearing surface 69. The second cam track 67 and second bearing surface 69 are located on the second flap 36 in corresponding positions to the first cam track 66 and first bearing surface 68. The first flap 34 further comprises a third cam track 58 that defines a third bearing surface 60. The second flap 36 further comprises a fourth cam track 62 that defines a fourth bearing surface 64. The fourth cam track 62 and bearing surface 64 are located on the second flap 36 in corresponding positions to the third cam track 58 and third bearing surface 60.

The first side wall 42 comprises a first static slot 74 in an upper portion of the exhaust nozzle 30. The first side wall 42 further comprises a second static slot in a lower portion of the exhaust nozzle 30. The second side wall 44 comprises a third static slot 78 in an upper portion of the exhaust nozzle 30. The second side wall 44 further comprises a fourth static slot in a lower portion of the exhaust nozzle 30 (not shown by FIG. 2). The first flap 34 comprises a first pin 82 that is slidably received by the first static slot 74. The second flap 36 comprises a second pin 84 that is slidably received by the second static slot. The first flap 34 further comprises a third pin 86 that is slidably received by the third static slot 78. The second flap 36 further comprises a fourth pin 88 that is slidably received by the fourth slot 80 (not shown by FIG. 2). Further features of the example exhaust nozzle 30 shown and not shown in FIG. 2 are now described with reference to FIGS. 3 to 6.

Figure 3:
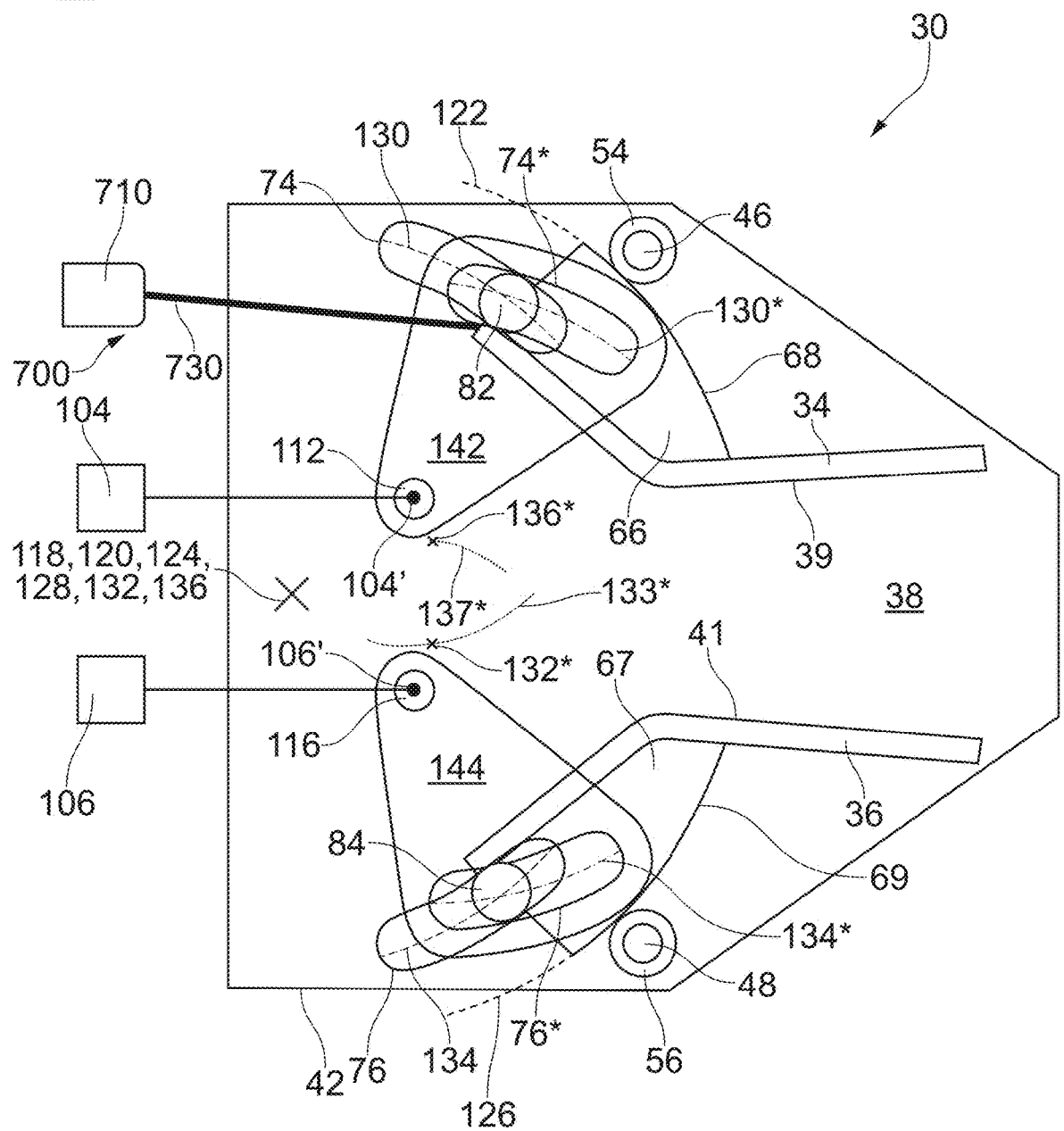
FIG. 3 is a side view of the example exhaust nozzle in a non-vectored dry-thrust configuration.

FIG. 3 is a side view of example exhaust nozzle 30 shown by FIG. 2 in a non-vectored dry-thrust configuration. The non-vectored dry-thrust configuration of the exhaust nozzle 30 is suitable for use when the engine 10 is operating dry (e.g., without reheat) and vectoring of thrust produced by the engine 10 away from a direction parallel to the rotational axis X-X is not intended. As described in further detail below, the first flap 34 is rotatably coupled to the exhaust duct 32 for rotation about a first axis of rotation 118 and the second flap 36 is rotatably coupled to the exhaust duct 32 for rotation about a second axis of rotation 120 that is coaxial (i.e. aligned) with the first axis of rotation 118. The first and second axes of rotation 118, 120 may be defined so as to give the optimal expansion ratio between the throat and exit of the exhaust nozzle 30.

The first flap 34 comprises a convergent portion and a divergent portion. Accordingly, the first flap 34 is a convergent-divergent flap. Likewise, the second flap 36 comprises a convergent portion and a divergent portion. Accordingly, the second flap 36 is also a convergent-divergent flap. The first and second flaps 34, 36 therefore define a convergent-divergent nozzle, but in other examples may have an alternative configuration that does not define a convergent-divergent nozzle.

Figure 5:
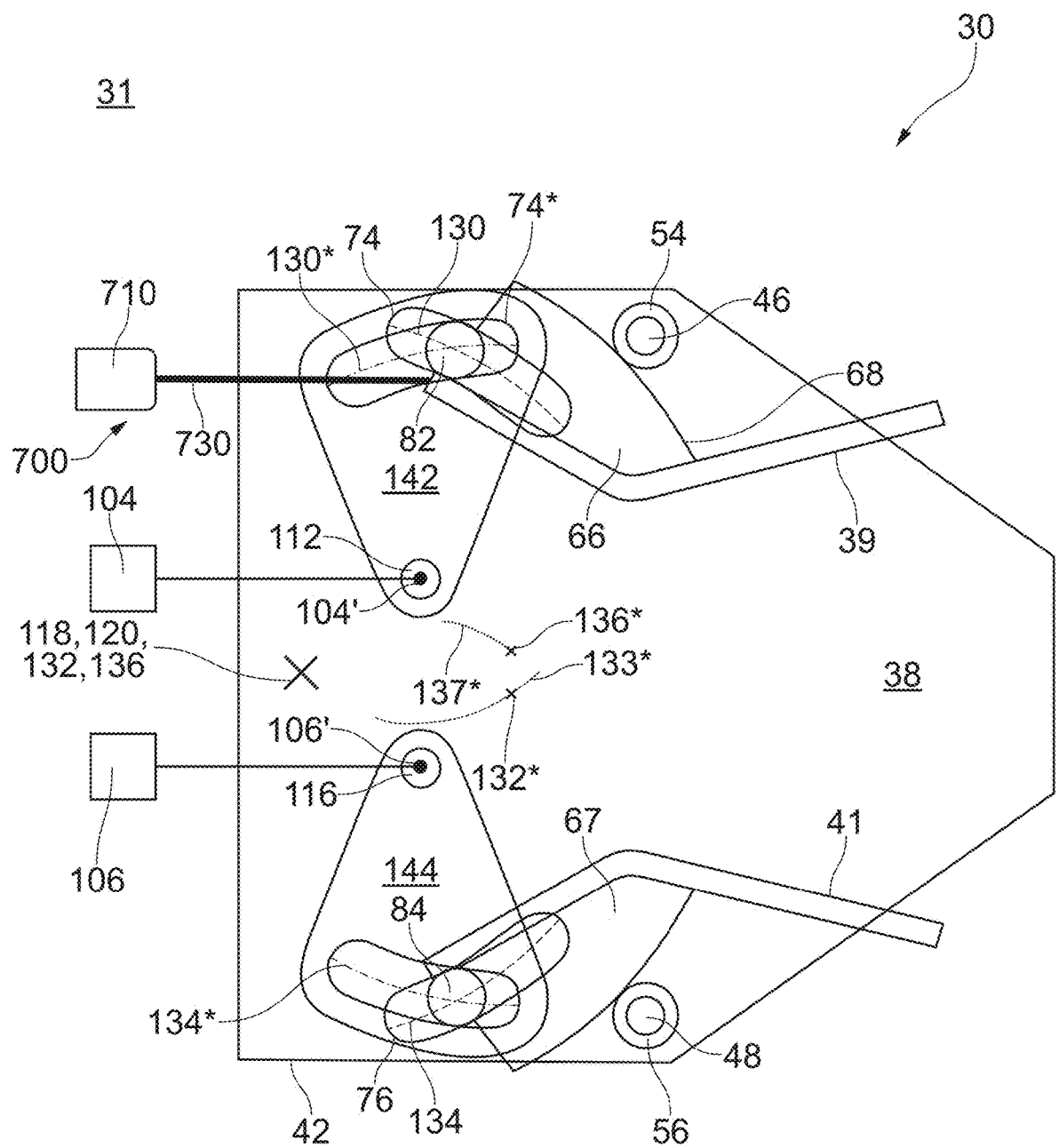
FIG. 5 is a side view of the example exhaust nozzle in a non-vectored wet-thrust configuration.

As shown in FIG. 3, the first bearing surface 68 forms part of a first curved surface 122 having a central axis 124 that is coaxial with the first and second axes of rotation 118, 120. The second bearing surface 69 forms part of a second curved surface 126 having a central axis 128 that is coaxial with the first and second axes of rotation 118, 120. In the example of FIG. 5, each curved surface 122, 126 is a cylindrical surface 122, 126 and the radius of the first cylindrical surface 122 is equal to the radius of the second cylindrical surface 126. Accordingly, the first and second cylindrical surfaces 122, 126 are coincident. A centreline of the first static slot 74 extends at least part way along a first static arc 130 having a centre 132 that is coincident with the first and second axes of rotation 118, 120. A centreline of the second static slot 76 extends at least part way along a second static arc 134 having a centre 136 that is coincident with the first and second axes of rotation 118, 120. Accordingly, the static slots 74, 76 have corresponding curved shapes. The radius of the first static arc 130 is equal to the radius of the second static arc 134. Accordingly, the first and second static arcs 130, 134 lie on a single circle. The first pin 82 and the first roller 54 are circumferentially separated with respect to the first axis of rotation 118. Similarly, the second pin 84 and the second roller 56 are circumferentially separated with respect to the second axis of rotation 120.

The exhaust nozzle 30 comprises a first moveable cam element 142 and a second moveable cam element 144. The first moveable cam element 142 is rotatably coupled to the first wall 42 at a first pivot 112, whereas the second moveable cam element 144 is rotatably coupled to the first wall 42 at a second pivot 116. In other examples, the first and second pivots 112, 116 may not be located in the first wall 42. For instance, the first and second pivots 112, 116 may be located at other fixed positions within the exhaust nozzle 30. The first moveable cam element 142 comprises a first moveable slot 74* which is configured to slidably receive the first pin 82. The first pin 82 extends through both the first static slot 74 and the first moveable slot 74* so as to partially constrain the relative positions of each. Similarly, the second moveable cam element 144 comprises a second moveable slot 76* which is configured to slidably receive the second pin 84. The second pin 84 extends through both the second static slot 76 and the second moveable slot 76* so as to partially constrain the relative positions of each.

A centreline of the first moveable slot 74* extends at least part way along a first moveable arc 130* having a centre 132*. A centreline of the second moveable slot 76* extends at least part way along a second moveable arc 134* having a centre 136*. Accordingly, each moveable slot 74*, 76* has a curved shape. In this example, the radius of the first moveable arc 130* is equal to the radius of the second moveable arc 134*.

The exhaust nozzle 30 also comprises a first actuator 104 and a second actuator 106. The first actuator 104 is generally configured to move the first moveable cam element 142 and thereby cause the first flap 34 to be moved, whereas the second actuator 106 is generally configured to move the second moveable cam element 142 and thereby cause the second flap 36 to be moved. In the example of FIG. 3, the first actuator 104 is a rotary-type actuator (e.g., including an electric motor) and a driving portion 104' of the first actuator 104 is pivotally coupled to the first moveable cam element 142 at the first pivot 112. Likewise, in the example of FIG. 3, the second actuator 106 is a rotary-type actuator (e.g., an including electric motor) and a driving portion 106' of the second actuator 106 is pivotally coupled to the second moveable cam element 144 at the second pivot 116. However, it will be appreciated that other actuator-types are suitable for use as the first actuator 104 and/or the second actuator 106. For instance, the or each actuator 104, 106 may be a linear-type actuator (e.g., including an electromagnetic solenoid or a hydraulic cylinder) and the driving end of the or each actuator may be coupled to the respectively moveable cam element 142, 144 other than at the pivot 112, 116.

During operation of the exhaust nozzle 30 (e.g., to move the flaps 34, 36), the first actuator 104 is able to actuate the first flap 34 about the first axis of rotation 118 through a plurality of first intermediate positions between a first inner position and a first outer position. It will be appreciated that the first inner position need not be the innermost position that the first flap 34 is able to be actuated to and the first outer position need not be the outermost position that the first flap 34 is able to be actuated to. During actuation of the first flap 34, the first pin 82 slides along the first static slot 74 and the first bearing surface 68 bears against the first roller 54. The first roller 54 constrains the motion of the first flap 34 to a predetermined path, such that movement of the first pin 82 along the first static slot 74 causes the first flap 34 to undertake a predetermined compound movement of translation and rotation with one degree of freedom (i.e., so that each position of the first pin 82 along the first static slot 74 corresponds maps to a single respective translational and rotational position of the first flap 34). In the non-vectored dry-thrust configuration shown by FIG. 3, the first flap 34 has been positioned (by means of the first actuator 104 positioning the first moveable cam element 142) at a first intermediate position between the first inner position and the first outer position.

During operation of the exhaust nozzle 30, the second actuator 106 is able to actuate the second flap 36 about the second axis of rotation 120 through a similar plurality of second intermediate positions in the same way.

The first and second flaps 34, 36 are actuatable to the positions shown in FIG. 3 in the non-vectored dry-thrust configuration. Examples of various additional combinations of positions that the first and second flaps 34, 36 are actuatable to in other configurations are described below with reference to FIGS. 4 to 6.

Figure 4:
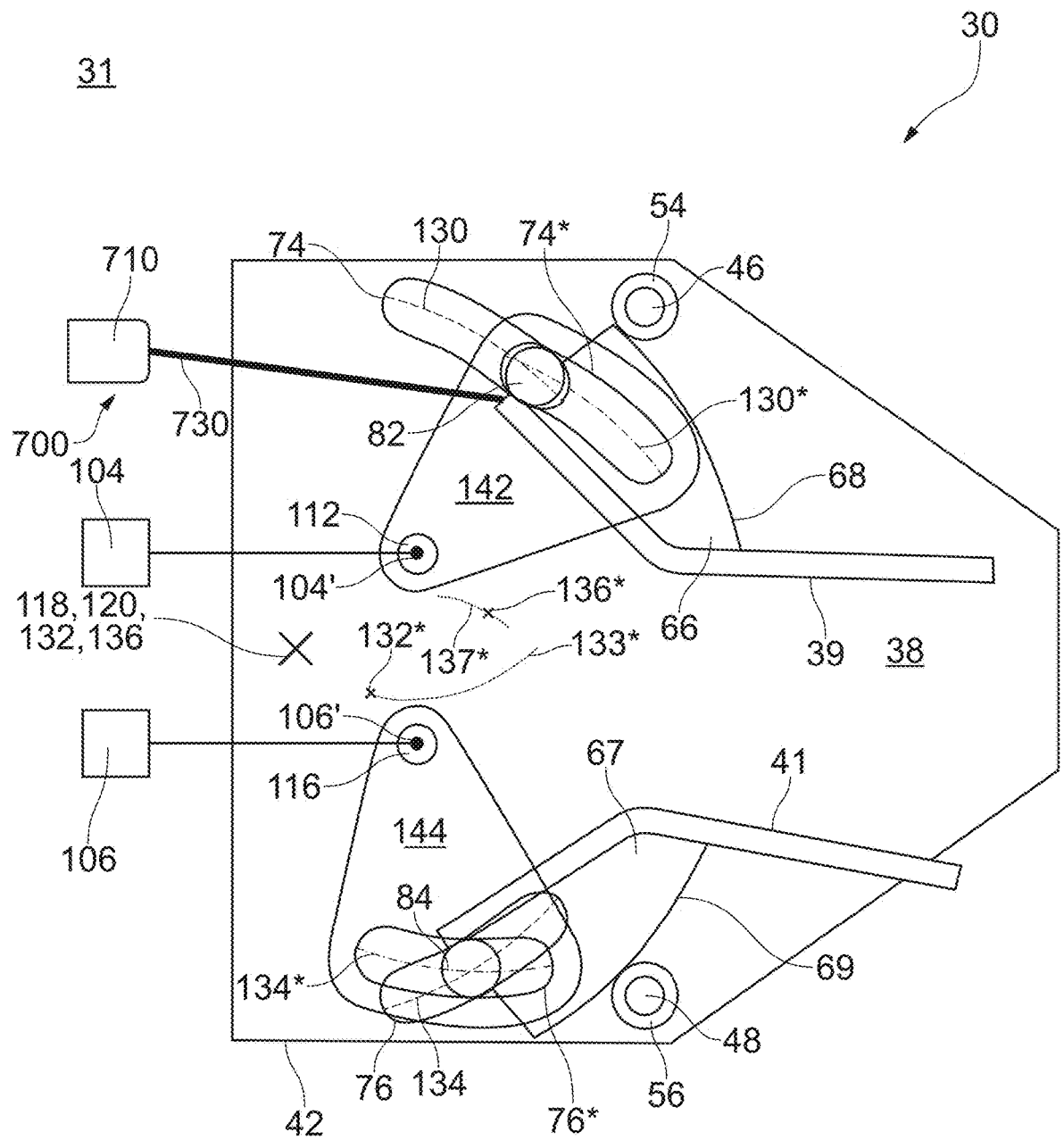
FIG. 4 is a side view of the example exhaust nozzle in a vectored dry-thrust configuration.

FIG. 4 is a side view of the example exhaust nozzle 30 shown by FIG. 2 in a vectored dry-thrust configuration. The vectored dry-thrust configuration of the exhaust nozzle 30 is suitable for use when the engine 10 is operating dry and vectoring of thrust produced by the engine 10 away from a direction parallel to the rotational axis X-X is intended. In the vectored dry-thrust configuration, the first flap 34 has been positioned (by means of the first actuator 104 positioning the first moveable cam element 142) at a first inner position in which the first flap 34 has been rotated approximately 6° closer to the principal rotational axis X-X of the gas turbine engine 10 compared to the first intermediate position shown by FIG. 3; and the second flap 36 has been positioned (by means of the second actuator 106 positioning the first moveable cam element 144) at a second intermediate position in which the second flap 36 has been rotated approximately 6° further from the principal rotational axis X-X of the gas turbine engine 10 compared to the second intermediate position shown by FIG. 3.

FIG. 5 is a side view of the example exhaust nozzle 30 shown by FIG. 2 in a non-vectored wet-thrust configuration. The non-vectored wet-thrust configuration of the exhaust nozzle 30 is suitable for use when the engine 10 is operating wet (e.g., with reheat) and vectoring of thrust produced by the engine 10 away from a direction parallel to the rotational axis X-X is intended. In the non-vectored wet-thrust configuration, the first flap 34 has been positioned (by means of the first actuator 104 positioning the first moveable cam element 142) at a first intermediate position in which the first flap 34 has been positioned relatively far away from the principal rotational axis X-X of the gas turbine engine 10 compared to the first intermediate position of the non-vectored dry-thrust configuration shown by FIG. 3 and the second flap 36 has been positioned (by means of the second actuator 106 positioning the second moveable cam element 144) at a second intermediate position in which the second flap 36 has been positioned relatively far away from the principal rotational axis X-X of the gas turbine engine 10 compared to the second intermediate position of the non-vectored dry-thrust configuration shown by FIG. 3. A minimum cross-sectional area of the exhaust gas passageway 38 is therefore greater in the non-vectored wet-thrust configuration shown by FIG. 5 than in the non-vectored dry-thrust configuration shown by FIG. 3.

Figure 6:
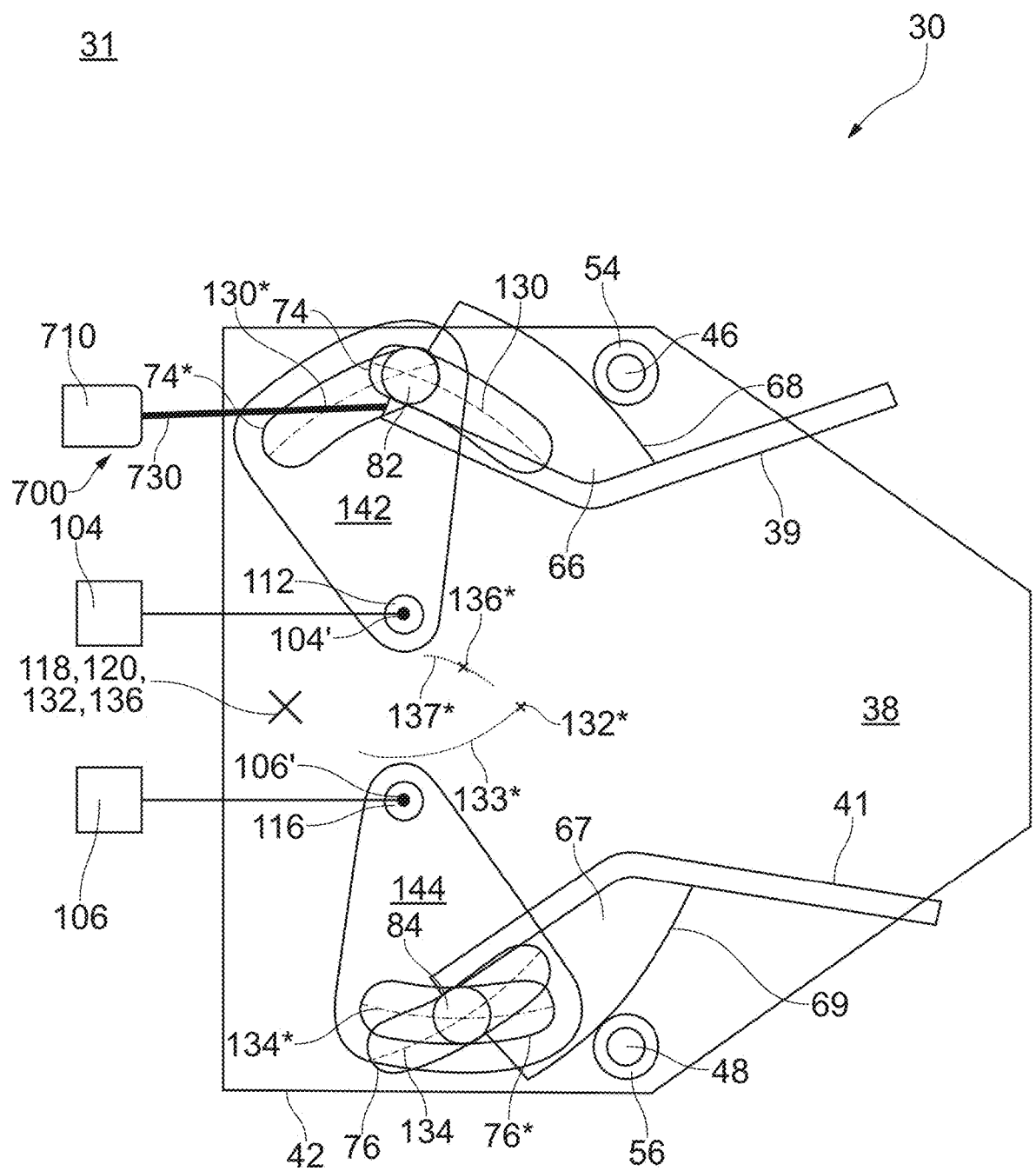
FIG. 6 is a side view of the example exhaust nozzle in a vectored wet-thrust configuration.

FIG. 6 is a side view of the example exhaust nozzle 30 shown by FIG. 2 in a vectored wet-thrust configuration. The vectored dry-thrust configuration of the exhaust nozzle 30 is suitable for use when the engine 10 is operating wet and vectoring of thrust produced by the engine 10 away from a direction parallel to the rotational axis X-X is intended. In the vectored wet-thrust configuration, the first flap 34 has been positioned (by means of the first actuator 104 positioning the first moveable cam element 142) at a first outer position in which the first flap 34 has been rotated approximately 6° further from to the principal rotational axis X-X of the gas turbine engine 10 compared to the first intermediate position shown by FIG. 5 and the second flap 36 has been positioned (by means of the second actuator 106 positioning the first moveable cam element 144) at a second intermediate position in which the second flap 36 has been rotated approximately 6° closer to from the principal rotational axis X-X of the gas turbine engine 10 compared to the second intermediate position shown by FIG. 5.

The position of the centre 132\* of the first moveable arc 130\* varies between each of the positions shown in FIGS. 3 to 6. In particular, the position of the centre 132\* moves along a first trace 133\* as the first cam element 142 (and therefore the first movable slot 74\*) is moved between the positions shown in each of FIGS. 3 to 6. Throughout the range of first intermediate positions and at both the first inner position and the first outer position of the first flap 34, the centre 132\* is offset from the first axis of rotation 118. Similarly, the position of the centre 136\* of the second moveable arc 134\* varies between each of the positions shown in FIGS. 3 to 5. Namely, the position of the centre 136\* moves along a second trace 137\* as the second cam element 144 (and therefore the second movable slot 76\*) is moved between the positions shown in each of FIGS. 3 to 6. Throughout the range of second intermediate positions and at both the second inner position and the second outer position of the second flap 36, the centre 136\* is offset from the second axis of rotation 120.

In both of the example exhaust nozzles 30 described above, the or each actuator 104, 106 is positioned on a side of the exhaust nozzle 30. That is, the or each actuator 104, 106 is positioned within the exhaust nozzle 30 such that the first side wall 42 is disposed between at least part of (e.g., the driving portion of) the or each actuator 104, 106 and the exhaust gas passageway 38. In particular, the or each actuator 104, 106 may be directly or indirectly mounted to the XX. In a previously-considered exhaust nozzle, an actuator for moving a flap of the exhaust nozzle was positioned on a top or a bottom of the exhaust nozzle (that is, was positioned within the exhaust nozzle such that the flap was disposed between at least part of the actuator and an exhaust gas passageway of the exhaust nozzle). The or each actuator 104, 106 being positioned on the side of the exhaust nozzle 30 is associated with a more compact exhaust nozzle 30 and/or an exhaust nozzle 30 which may be more easily integrated within a gas turbine engine 10 and/or an airframe to which the gas turbine engine 10 is incorporated. In addition, the or each actuator 104, 106 being positioned on the side of the exhaust nozzle 30 rather than on the top and/or the bottom of the exhaust nozzle 30 may enable the use of more lightweight components (e.g., for the or each flap and/or the or each actuator) and therefore enable a mass of the exhaust nozzle 30 to be lowered.

In use, a pressure load imposed by each flap 34, 36 on the corresponding pin 82, 84 is at least partially opposed (e.g., reacted to) by strain in the structure(s) surrounding the respective slots 74, 74\*, 76, 76 rather than by being largely (e.g., entirely) opposed by a force provided by the actuator(s) 104, 106. This enables actuator(s) 104, 106 having a relatively lower load rating to be selected for use in the exhaust nozzle 30, which is associated with a reduced size and/or mass of the actuator(s) and therefore a reduced mass of the exhaust nozzle 30 and/or increase ease of incorporation of the exhaust nozzle 30 within a gas turbine engine 10 or an airframe. In addition, the curved shape of the or each moveable slot 74\*, 76\* has the effect of smoothing a profile of the load applied to (and by) the actuators 104, 106 between the inner and outer positions of the flaps 34, 36, especially as a result of the combination with the curved shape of each static slot 74, 76 and the centres 132\*, 136\* of each moveable slot 74*, 76* being offset from offset from the first and second axes of rotation 118, 120 (throughout the range of positions of each flap 34, 36). This results in a reduction in the load applied to the actuator(s) 104, 106 at various points between the inner and outer positions of the flaps 34, 36. This may enable the actuator(s) to have a lowered load rating, which is associated with the benefits described above.

Also shown, highly schematically, in each of FIGS. 3 to 6 is a ducting system 700 (or, more simply, a system 700). The ducting system comprises a first structure 710 and a conduit 730. The first flap 34 forms a part of the ducting system 700, and the first flap 34 may be referred to as a second structure 720 of the ducting system 700. The first structure 710 is fixed with respect to, and may form a part of, the first side wall 42. Consequently, the second structure 720, 34 is movable (and, in use, moves) with respect to the first structure 710 as shown by FIGS. 3 to 6. For this reason, the ducting system 700 may be referred to as an articulatable (or articulating) ducting system 700.

The ducting system is generally configured to convey a coolant fluid (e.g., a gas comprising air) from the first structure 710 to the second structure 720, 34 via the conduit 730 for the purpose of cooling the second structure 720, 34, and in particular for cooling the control surface 39 of the first flap 34. The first control surface 39 of the first flap 34 is, in use, exposed to the exhaust flow of gas conveyed through the exhaust gas passageway 38. As a result, the first control surface 39 may also be referred to as a first gas-exposed surface 39. The coolant fluid may be, in particular, a fluid received (directly or indirectly) into the first structure 710 from another part of the gas turbine engine 10, such as gas from a section of the core upstream of the combustor 15 (e.g., the compressor(s) 13, 14) or from the bypass duct 22 (e.g., from the propulsive fan 12). Once conveyed into the second structure 720, 34, the coolant fluid (e.g., the gas) may flow through (e.g., be ported through) one or more apertures provided in the first gas-exposed surface 39 into a region of the exhaust gas passageway 38 proximal to the first gas-exposed surface 39. As a result, a boundary region of relatively cool gas between the exhaust gas passageway 38 and the first flap 34 is generated. This reduces a rate of heat transfer into the exhaust flaps, thereby restraining and/or reducing a temperature of the first flap 34 (and, in particular, of the first control surface 39) during operation of the gas turbine engine 10. This may be referred to as effusion cooling. Compared to other cooling methods, such as film cooling, effusion cooling reduces an amount of cooling fluid flow required for effective cooling of the first flap 34 and also ensures more uniform cooling across the first control surface 39.

Figure 7:
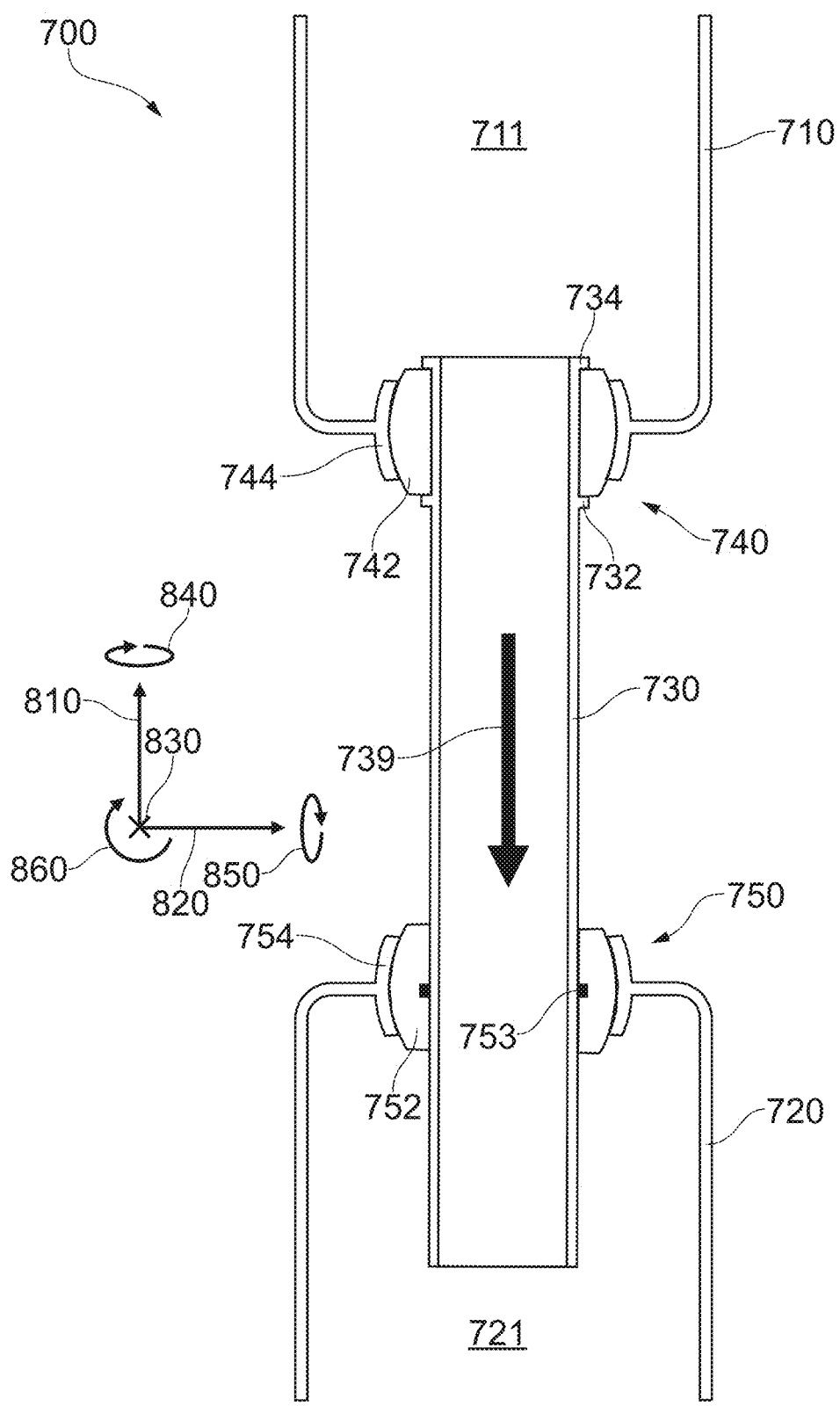
FIG. 7 is a sectional view of an example ducting system in an aligned position.
Figure 8:
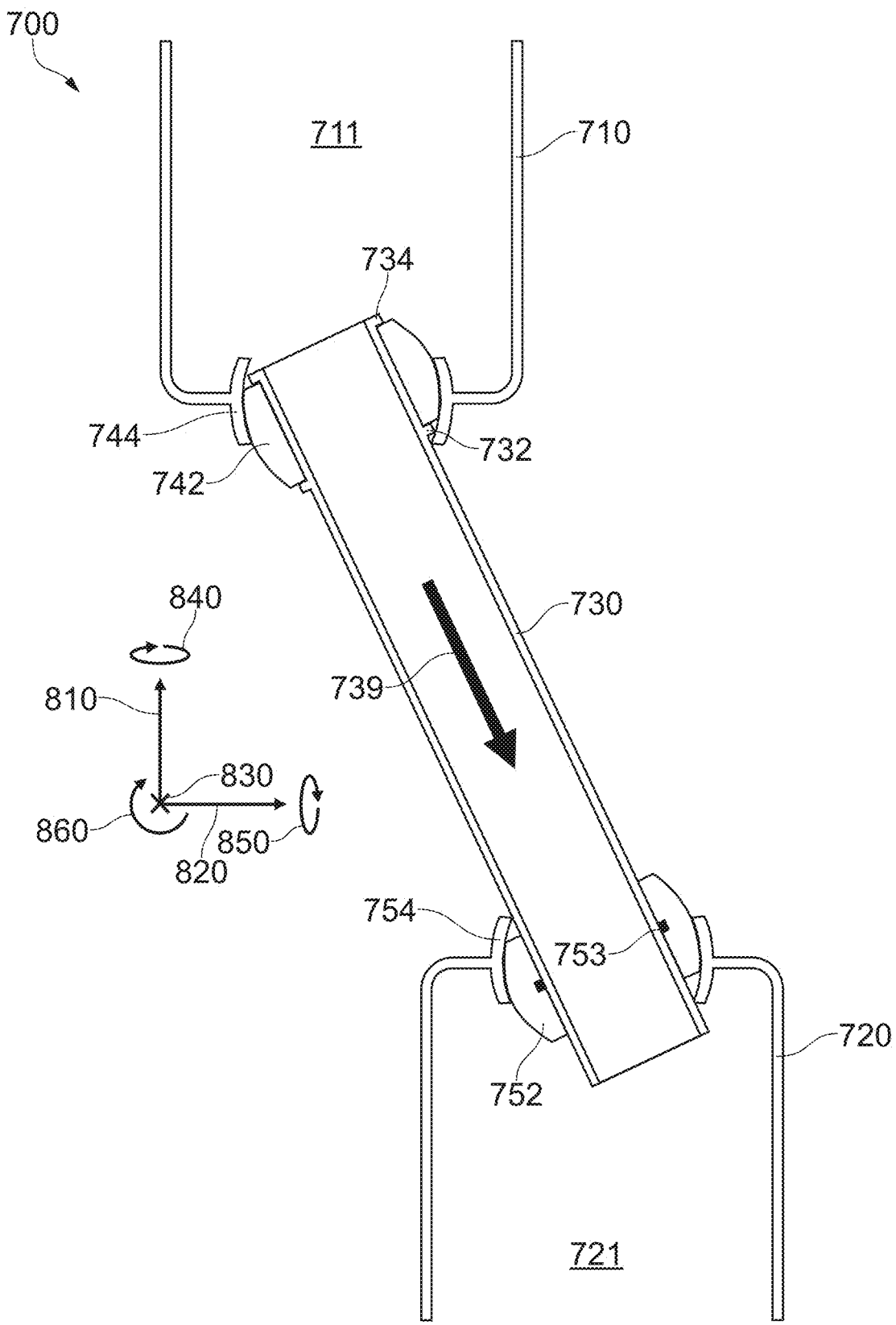
FIG. 8 is sectional view of the example ducting system in a translationally misaligned position.
Figure 9:
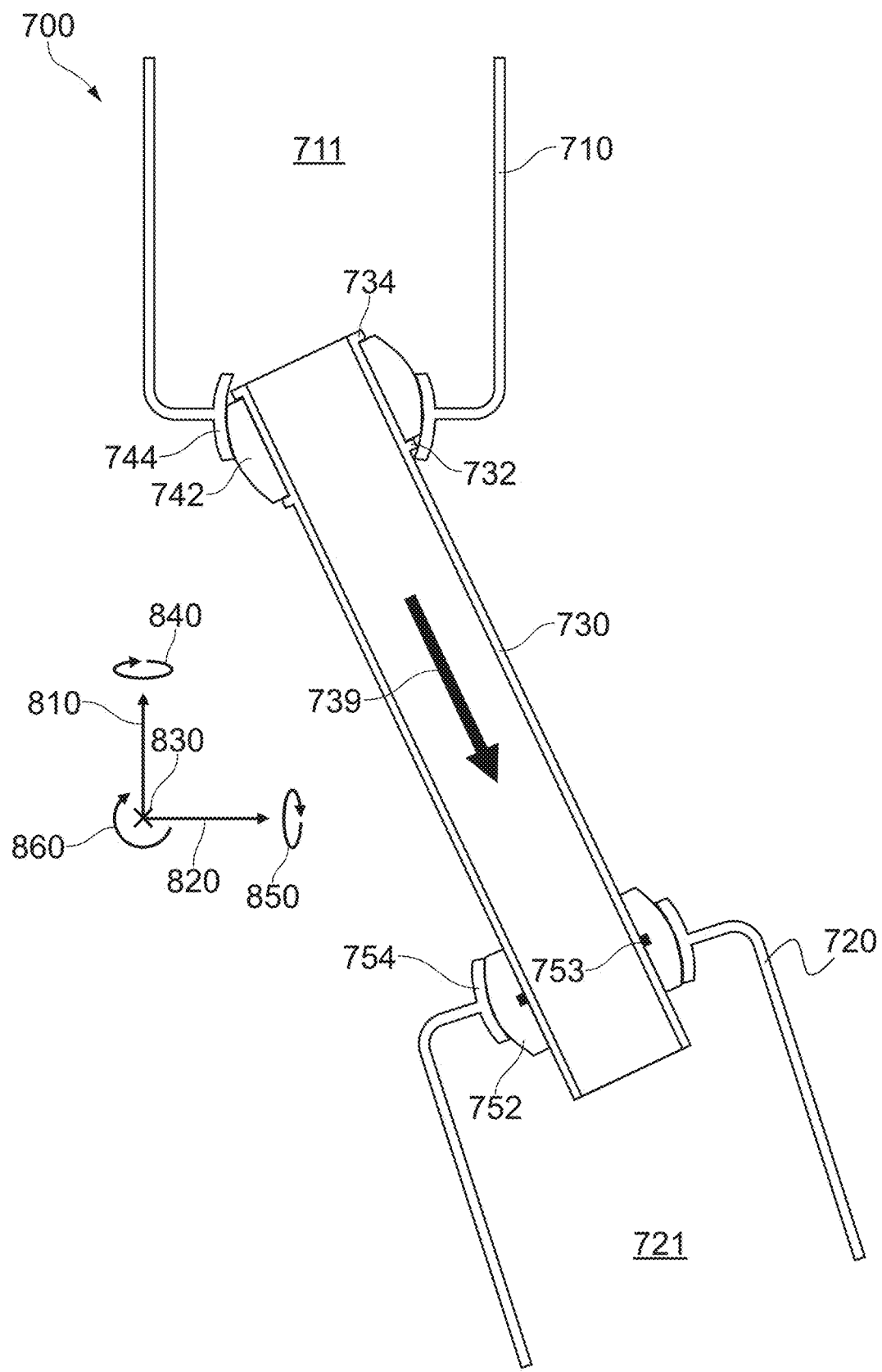
FIG. 9 is a sectional view of the example ducting system in a translationally and rotationally misaligned position.

FIGS. 7 to 9 show a detailed sectional views of a ducting system 700 suitable for use as the ducting system 700 described above with reference to FIGS. 3 to 6, with like reference signs denoting common or similar features. Although the ducting system 700 may supply a fluid to the exhaust nozzle 30 described above, it is also envisaged that the ducting system 700 may supply fluid to any other type of exhaust nozzle, or any other component of a gas turbine engine. Also shown, for reference, is a coordinate system defining an x-translational direction 810 (which is parallel with the principal and rotational axis X-X of the gas turbine engine 10 when the ducting system 700 is incorporated therein), a y-translational direction 820 and a z-translational direction 830. The coordinate system 800 also defines a u-rotational direction 840, a w-rotational direction 850 and a v-rotational direction 860.

In FIG. 7, the first structure 710 is substantially aligned with the second structure 720 (e.g., the flap 34) along the y-direction 820 and the z-direction 830. This may be referred to as a fully aligned position of the ducting system 700. In FIG. 8, the second structure 720 is displaced with respect to the first structure 710 along the y-direction 820. This may be referred to as a translationally misaligned position of the ducting system 700. In FIG. 9, the second structure 720 is displaced with respect to the first structure 710 along the y-direction 820 and has also been rotated away from the rotational alignment of the first structure 710 in the v-direction 860. Accordingly, this may be referred to as a rotationally misaligned position of the ducting system 700 (and, in equally correct terms, as a translationally misaligned position or a translationally and rotationally misaligned position of the ducting system 700).

The first structure 710 defines a first internal volume 711 whereas the second structure 720 defines a second internal volume 721. The conduit 730 is configured to convey the coolant fluid from the first internal volume 711 to the second internal volume 730 in the direction indicated by arrow 739. More specifically, the conduit 730 extends between a first spherical joint 740 and a second spherical joint 750 and thereby fluidically connects the first internal volume 711 to the second internal volume 721. In the example of FIGS. 7 to 9, the conduit 730 has a substantially circular cross-section through its longitudinal axis. However, other (e.g., non-circular) cross-sectional forms for the conduit 730 are envisaged.

The first spherical joint 740 is associated with the first structure 710. The first spherical joint 740 comprises an inner formation 742 and a complementary outer formation 744. Each formation 742, 744 defines a bearing surface which, in use, slidably engages (e.g., interfaces) with the bearing surface of the corresponding formation. In addition, the inner formation 742 defines an internal aperture through which the conduit 730 extends. The bearing surface of the first inner formation 742 has the shape of a spherical segment and the bearing surface of the first outer formation has a complementary shape. In the example of FIG. 9, the first outer formation 744 is defined by, and thus forms an integral part of, the first structure 710. The inner formation 742 substantially cooperates with (e.g., cooperates with and/or is pre-loaded against) the outer formation 744 so as to provide a close clearance fit in operation (e.g., to provide a H8/f7 ISO 286-1 hole-basis fit or a ISO 286-1 F8/h7 shaft-basis fit in operation) at the interface between the bearing surfaces thereof. That is, the inner and outer formations 742, 744 are configured so that they do not substantially cooperate (e.g., cooperate) to provide an interference fit therebetween. Such a fit may cause bending moments to act on the conduit 730 and/or the first structure 710 and thus cause misalignment therebetween. The inventor has found that pressure losses around the inner formation 742 may still be acceptably small due to a pressure differential between the first internal volume 711 and a space surrounding the ducting system 700 that arises during use of the ducting system 700 to convey gas from the first structure 710 to the second structure 720. Specifically, such a pressure differential causes the bearing surface of the inner formation 742 to be (further) loaded against the outer formation 744 in a region proximal to the conduit 730 (and distal to the first internal volume 711) because a side of the inner formation 742 which is exposed to the first internal volume 711 is subject to a relatively high gas pressure. This reduces pressure losses within the ducting system 700 due to leakage through the interface between the inner formation 742 and the outer formation 744 (e.g., from the first internal volume 711) while allowing relative movement between the respective formations 742, 744. Those skilled in the art will appreciate that the relevant components may be manufactured according to different tolerance range(s) to account for an elevated temperature of the ducting system 700 in operation and thereby provide the type of fit(s) discussed above. Further, the ducting system 700 may be configured such that the conduit 730 cannot slide with respect to the inner formation 742. To this end, the conduit 730 defines a pair of annular flanges 732, 734 between which the inner formation 742 is disposed. In other examples, the conduit 730 may be integral with the inner formation 742 of the first spherical joint 740, in which case the conduit 730 cannot slide with respect to the inner formation 742.

Similarly, the second spherical joint 750 is associated with the second structure 720. The second spherical joint 750 comprises an inner formation 752 and a complementary outer formation 754, each of which are generally similar to the formations 742, 744 described above in respect of the first spherical joint 740. However, the ducting system is configured such that the conduit 730 is slidable with respect to the inner formation 752 of the second spherical joint 750. This facilitates free movement of the second structure 720 with respect to the first structure 710, as may be seen by comparison of FIG. 7 with each of FIGS. 8 and 9. In the former, the conduit 730 extends relatively deeply into the second internal volume 721. In the latter, the conduit 730 has been retracted so as to only relatively shallowly extend into the second internal volume 721. As a result, a distance between the first structure 710 and the second structure 702 along the x-direction 810 need not be reduced in order to allow the misalignment between the structures 710, 720 along the y-direction 820. Further, a seal 753, such as a pneumatic seal, is disposed within the inner formation 752 of the second spherical joint 750 to reduce pressure losses within the ducting system 700 due to leakage through the interface between the inner formation 742 and the conduit 730 (e.g., from the second internal volume 721). Suitable seals include piston-ring type seals and the like.

Because of the nature of the spherical joints 740, 750 and the conduit 730 as described herein, the second structure 720 is able to translate relative to the first structure 710 in each of the mutually orthogonal translational directions 810, 820, 830 described above and is also able to rotate relative to the first structure 710 in each of the mutually orthogonal rotational directions 840, 850, 860.

The ducting system 700 may be configured such that the conduit 730 is not rotatable relative to the first spherical joint 740 and/or the second spherical joint 750. By way of example, the conduit 730 may define or be provided with at least one spline configured to positively engage a complementary recess in the respective inner formation 742, 752 (or vice versa) to restrict relative rotation therebetween. This may prevent unnecessary and undesirable movement between the conduit 730 and the respective inner formation 742, 752. (Relative rotation may instead occur between respective inner and outer formations.) In other examples, the conduit 730 may be rotatable relative to either or both of the first and second spherical joints 740, 750.

The ducting system 700 may comprise a plurality of conduits 730, with each conduit 730 extending through a corresponding pair of spherical joints 740, 750, each of which are associated with a respective one of the structures 710, 720, so as to provide a plurality of separate fluidic connections between the first structure 710 and the second structure 720. Each conduit 730 and spherical joint 740, 750 may have any of (e.g., each of) the features described herein. Such an arrangement may allow gas to be provided to the second structure 720 for cooling thereof at a lower average pressure, which is associated with reduced pressure losses within the ducting system 700. In turn, this is linked with a lower thrust output reduction of the gas turbine engine 10 due to operation of the ducting system 700.

This disclosure anticipates that the exhaust nozzle 30 may comprise an additional ducting system (not shown) provided for the purpose of cooling the second flap 36. The additional ducting system may have any of (e.g., each of) the features described with respect to the ducting system 700. Namely, the additional ducting system may have at least a first structure, a second structure and a conduit as described above, with the second flap 36 being the second structure.

Although the ducting system 700 has been described in the context of an exhaust nozzle assembly 30 of a gas turbine engine 10, it will be appreciated that ducting systems 700 as shown and described herein may be applicable in other contexts. In particular, the present disclosure envisages that such ducting systems 700 may form at least a part of a combustor assembly 15 (e.g., a feed subsystem of the combustor assembly 15) and/or a reheat/afterburner assembly of a gas turbine engine (e.g., a feed subsystem of the reheat/afterburner assembly). In particular, ducting systems 700 in accordance with the present disclosure may be especially useful for cooling of various components of such assemblies in a similar manner to that described above with respect to the second structure 720, 39 of the exhaust nozzle assembly 30.

Ducting systems in accordance with those described herein enable fluid to be effectively transferred from a static structure to a relatively moveable structure, such as for the purpose of cooling. Specifically, ducting systems in accordance with those described herein enable a high-pressure coolant fluid (e.g., gas comprising air) to be efficiently transferred from a static casing into a relatively moveable structure in a high-temperature and high-vibration environment. In the context of exhaust nozzles 30, this is associated with a reduced amount of airflow which may be used for the purpose of cooling of the exhaust flap(s), which is in turn associated with a lower thrust output reduction of the gas turbine engine 10 due to use of the ducting system to provide cooling. In various applications, this may preserve an advantage of using effusion cooling for the second structure compared to film cooling of the same. Moreover, this is associated with an increased mean time between failures (MTBF) of the ducting system 700, thereby reducing maintenance requirements for the exhaust nozzle 30 and/or the gas turbine engine 10 as a whole. Further, ducting systems 700 as described herein are capable of tolerating a range of movement in a variety of directions (e.g., in a total of six directions, including three translational directions and three rotational directions), thereby facilitating the use of exhaust flaps 34, 36 that are actuatable through a wide range of positions as shown by FIGS. 3 to 6. Yet further, ducting systems 700 in accordance with those described herein are relatively spatially compact, which promotes integration into a gas turbine engine 10 (e.g., into an exhaust nozzle assembly 30 of a gas turbine engine 10). In addition, ducting systems in accordance with the present disclosure reduce (e.g., eliminate) the need for the use highly compliant materials in manufacture thereof, which may be prone to material failure (e.g., cracking) during use in a high-temperature and/or a high-vibration environment.

Namely, compared to previously-considered ducting systems, ducting systems in accordance with the present disclosure provide more robust, more spatially compact and less lossy (e.g., exhibit smaller pressure losses). Such previously-considered ducting systems include bellows, nested ducts, and flexible tubes. By way of example, flexible tubes and bellows may be liable to crack in high-vibration environments. By way of further example, nested ducts may exhibit relatively high-pressure losses and provide various limitations to relative movement between structures.

I claim:

1. An articulatable ducting system for a gas turbine engine, the system comprising:
   a first structure defining a first internal volume;
   a second structure defining a second internal volume, the second structure being movable with respect to the first structure;
   a first spherical joint associated with the first structure;
   a second spherical joint associated with the second structure; and
   a conduit extending between the first and second spherical joints and thereby fluidically connecting the first internal volume to the second internal volume,
   wherein the conduit is configured to move with respect to the second spherical joint so as to at least partially extend into the second internal volume.

2. The system of claim 1, wherein the system is configured such that the second structure is translatable relative to the first structure in three mutually orthogonal directions.

3. The system of claim 1, wherein the system is configured such that the second structure is rotatable relative to the first structure in three mutually orthogonal directions.

4. The system of claim 1, wherein the conduit is configured to slide with respect to the second spherical joint so as to at least partially extend into the second internal volume.

5. The system of claim 1, wherein each spherical joint comprises complementary inner and outer formations, and wherein the conduit is fixed with respect to the inner formation of the first spherical joint.

6. The system of claim 1, wherein each spherical joint comprises complementary inner and outer formations, and wherein the outer formation of each spherical joint is defined by a respective one of the structures.

7. The system of claim 1, wherein each spherical joint comprises complementary inner and outer formations, and wherein the inner and outer formations of each spherical joint substantially cooperate to provide a clearance fit therebetween in operation.

8. The system of claim 1, wherein each spherical joint comprises complementary inner and outer formations, and wherein the conduit extends into a pneumatic seal disposed within the inner formation of at least one of the spherical joints.

9. The system of claim 1, wherein the second structure includes a flap configured to at least partially define an exhaust gas passageway of a gas turbine engine.

10. The system of claim 1, wherein the system is configured to convey a fluid from the first internal volume to the second internal volume via the conduit for cooling the second structure.

11. The system of claim 1, wherein the first spherical joint is one of a plurality of first spherical joints, each associated with the first structure;
    the second spherical joint is one of a plurality of second spherical joints, each associated with the second structure; and
    the conduit is one of a plurality of conduits, each extending between respective first and second spherical joints and thereby fluidically connecting the first internal volume to the second internal volume.

12. An assembly for a gas turbine engine comprising the system of claim 1, the assembly being configured to form at least a part of: an exhaust nozzle; a combustor; or a reheat.

13. A gas turbine engine comprising the system of claim 1.

14. The gas turbine engine of claim 13, wherein the first structure is configured to receive a gas from a compressor or a propulsive fan of the gas turbine engine, and wherein the system is configured to convey the gas from the first internal volume to the second internal volume via the conduit.

15. An articulatable ducting system for a gas turbine engine, the system comprising:
    a first structure defining a first internal volume;
    a second structure defining a second internal volume, the second structure being movable with respect to the first structure;
    a first spherical joint associated with the first structure;
    a second spherical joint associated with the second structure; and
    a conduit extending between the first and second spherical joints and thereby fluidically connecting the first internal volume to the second internal volume, wherein the conduit includes a pair of annular flanges between which an inner formation of the first spherical joint is disposed such that the conduit is fixed with respect to the inner formation of the first spherical joint.

* * * * *